United States Patent
Jorgensen

(10) Patent No.: US 9,249,916 B2
(45) Date of Patent: Feb. 2, 2016

(54) MAXIMUM EXPANSION PLUG FOR HEAT EXCHANGER TUBES

(71) Applicant: JNT Technical Services, Inc., Little Ferry, NJ (US)

(72) Inventor: Glenn F. Jorgensen, Little Ferry, NJ (US)

(73) Assignee: JNT Technical Services, Inc., Little Ferry, NJ (US)

( * ) Notice: Subject to any disclaimer, the term of this patent is extended or adjusted under 35 U.S.C. 154(b) by 2 days.

(21) Appl. No.: 14/254,138

(22) Filed: Apr. 16, 2014

(65) Prior Publication Data

US 2015/0300553 A1    Oct. 22, 2015

(51) Int. Cl.
*F16L 55/00*    (2006.01)
*F16L 55/11*    (2006.01)

(52) U.S. Cl.
CPC ......... *F16L 55/1108* (2013.01); *F16L 55/1141* (2013.01)

(58) Field of Classification Search
CPC ....... Y10T 29/4994; F28F 11/02; F16L 55/13
USPC ............... 138/89, 93, 97; 165/71; 220/234
See application file for complete search history.

(56) References Cited

U.S. PATENT DOCUMENTS

| | | | | |
|---|---|---|---|---|
| 4,390,042 A | * | 6/1983 | Kucherer et al. | 138/89 |
| 4,590,991 A | * | 5/1986 | Cooper et al. | 165/69 |
| 4,646,816 A | * | 3/1987 | Rothstein | 165/76 |
| 4,734,972 A | * | 4/1988 | Hawkins | 29/426.4 |
| 4,751,944 A | * | 6/1988 | Sinha et al. | 138/89 |
| 4,800,637 A | * | 1/1989 | Overbay | 29/426.6 |
| 5,289,851 A | | 3/1994 | Jorgensen | |
| 5,456,290 A | * | 10/1995 | Haberman et al. | 138/89 |
| 5,465,483 A | * | 11/1995 | Fink et al. | 29/890.031 |
| 5,560,394 A | | 10/1996 | Jorgensen | |
| 6,883,547 B1 | | 4/2005 | Jorgensen | |
| 6,981,524 B2 | | 1/2006 | Jorgensen | |

* cited by examiner

*Primary Examiner* — Patrick F Brinson
(74) *Attorney, Agent, or Firm* — David L. Nocilly; Bond Schoeneck & King, PLLC

(57) ABSTRACT

A plug for sealing the end of a tube including a cylindrical housing member having longitudinal bore that communicates with a threaded portion. An insert member having a threaded end portion is received within the threaded portion of the bore and supports a frustroconical member that deflects at least a portion of the wall of the housing member that is highly ductile. The frustroconical member has a correspondingly large angle of taper to deflect the wall of the housing member outwardly as much as possible without causing fracturing of the wall.

14 Claims, 6 Drawing Sheets

MAXIMUM EXPANSION PLUG FOR HEAT EXCHANGER TUBES

BACKGROUND OF THE INVENTION

1. Field of the Invention

The present invention relates to a plug used to form a seal for tubes, pipes and similar conduits which transport steam, liquid or gases under pressure and, more particularly, to a plug having an increases degree of expansion to fit larger diameter tubes.

2. Description of the Related Art

In the construction of boilers and other heat exchange equipment, such as those used in the power generation and chemical industries, there is often a need to seal tubes, pipes and similar conduits which transport steam, liquid or gasses under pressure. This sealing is frequently accomplished by the insertion of a plug into the tube. For example, Applicant has disclosed several such plugs in U.S. Pat. Nos. 5,289,851, 6,883,547, and 6,981,524 that, upon insertion, will expand to sealingly engage the inner surface of a boiler or heat exchanger tube. These plugs are limited, however, in their degree of expansion and are thus unable to be used in circumstances where the plug needs to expand a large distance because the plug cannot expand sufficiently without degrading or fracturing, and thus will not properly maintains a seal against leakage of steam, water or other gasses or fluids, over an extended period of time and with a high degree of reliability.

BRIEF SUMMARY OF THE INVENTION

The present invention comprises a boiler tube plug having a hollow housing that cooperates with a threaded insert to deflect a portion of the hollow housing outwardly, thereby engaging the inside surface of a tube to be plugged. The deflected portion of the hollow housing is comprises of a highly ductile material and the threaded insert includes a frustroconical member that deflects the highly ductile wall of the hollow housing outward into engagement with the tube to be plugged as the insert is threaded into the hollow housing. Preferably, at least a portion of the wall of the housing has the mechanical property of high ductility and low hardness. To impart a large deflection, the frustroconical member should have more than four degrees of taper relative to the longitudinal axis of the housing. The resulting plug can expand up to about ten percent of its overall diameter in order to plug holes that are larger than possible with conventional plugs and can be used in high or low pressure applications, such as feedwater heaters, moisture separator reheaters, preheaters, condensers, coolers, fin-fan coolers or any other tubed heat exchanger.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
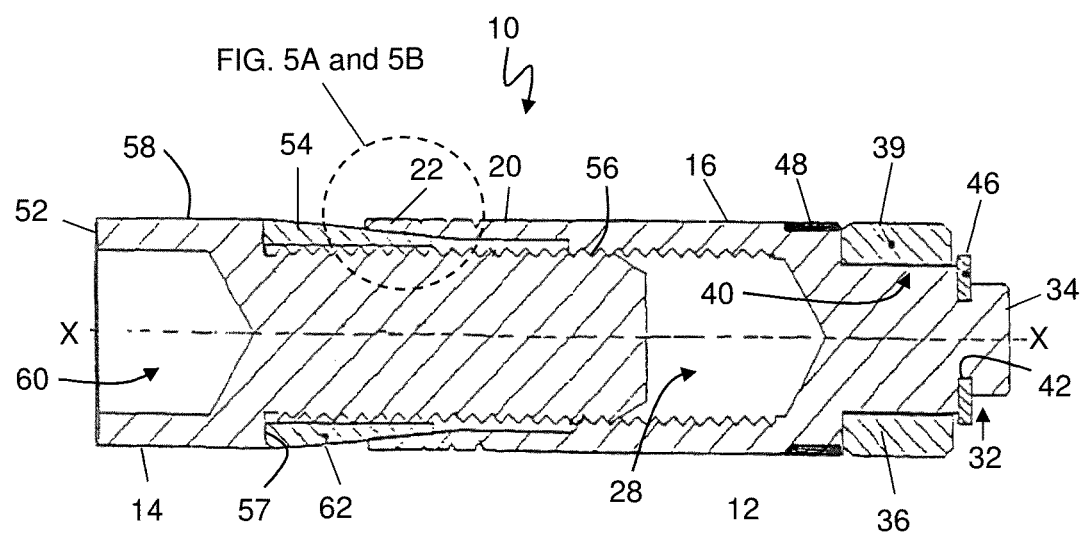
FIG. 1 is a cross-sectional view of a heat exchanger tube plug made in accordance with the present invention.
Figure 4:
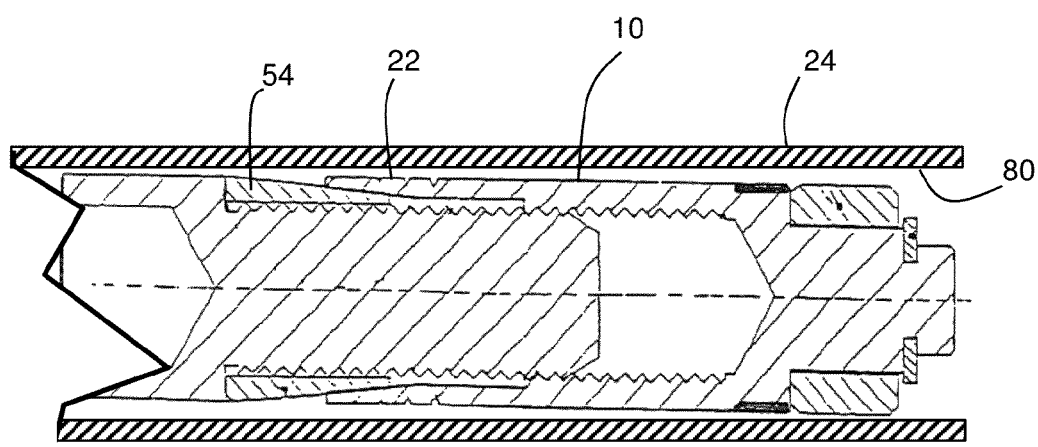
FIG. 4 is a cross-sectional view of a heat exchanger tube plug made in accordance with the present invention after positioning into a heat exchanger tube and prior to activation.

Referring now to the drawings, wherein like reference numerals refer to like parts throughout, there is seen in FIG. 1 a boiler tube plug 10 made in accordance with the present invention. Plug 10 comprises a hollow housing member 12 and an insert member 14. Housing member 12 has a cylindrical body 16, the rear portion of which is formed with a large open bore 18. Bore 18 is surrounded by relatively thin wall 20, the end portion 22 of which is deformable and will expand outwardly to provide a seal with a heat exchanger tube 24, as is shown in FIG. 4, when insert member 14 is screwed into housing member 12. Housing member 12 also includes a relatively smaller internally threaded cylindrical bore 28 which communicates with the large bore 18.

Figure 5A:
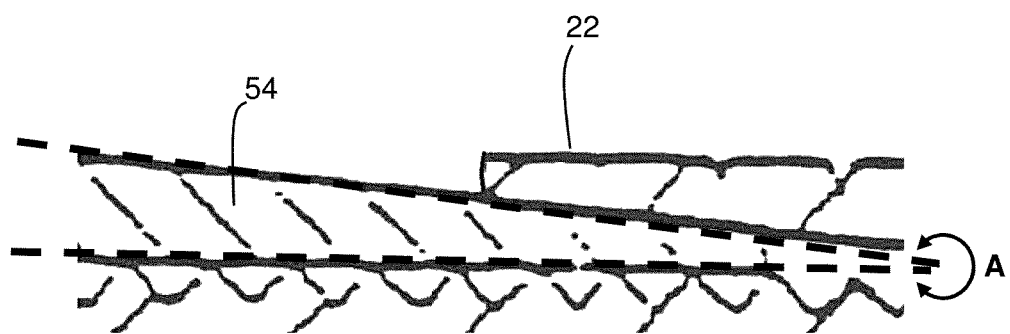
FIGS. 5A and 5B are cross-sectionals view of the portion of the heat exchanger tube plug identified in FIG. 1.
Figure 5B:
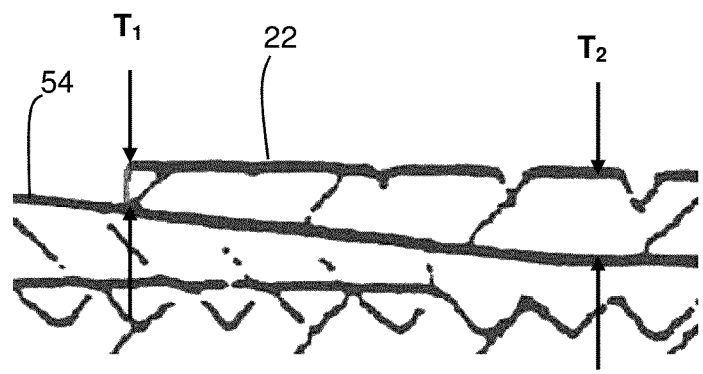

As further seen in FIG. 5B, end portion 22 of thin wall 20 has a predetermined thickness T that, as seen in FIG. 5, preferably includes a slight taper that extends from a thickness $T_1$ to a thickness $T_2$. For plug 10 having an outer diameter of 0.60, thickness $T_1$ may be between 0.020 and 0.050 inches (or approximately 3.33 to 8.33 percent of the outer diameter) and extend to a $T_2$ of between 0.035 and 0.065 inches (or approximately 5.83 to 10.83 percent of the outer diameter). The increased thickness is accomplished by the use of a ductile material having an elasticity modulus between 10,000 ksi to 30,000 ksi and a low hardness (Brinell/Rockwell B) score. Thin wall 20 having thickness T and an elasticity of 10,000 ksi to 30,000 ksi is possible by using a material such as carbon or stainless steel, and processing the material to ensure the appropriate amount of ductility, such as by annealing to at least a temperature of 1,150° F. and cooling slowly. Alternatively, polymers, and metal alloys with sufficient mechanical ductility and elasticity may be used. As described below and seen in FIG. 6, the sealing region of thin wall 20 has been enhanced by machining sharp ascending deep grooves 60 to ensure a positive mechanical seal upon expansion.

Figure 2:
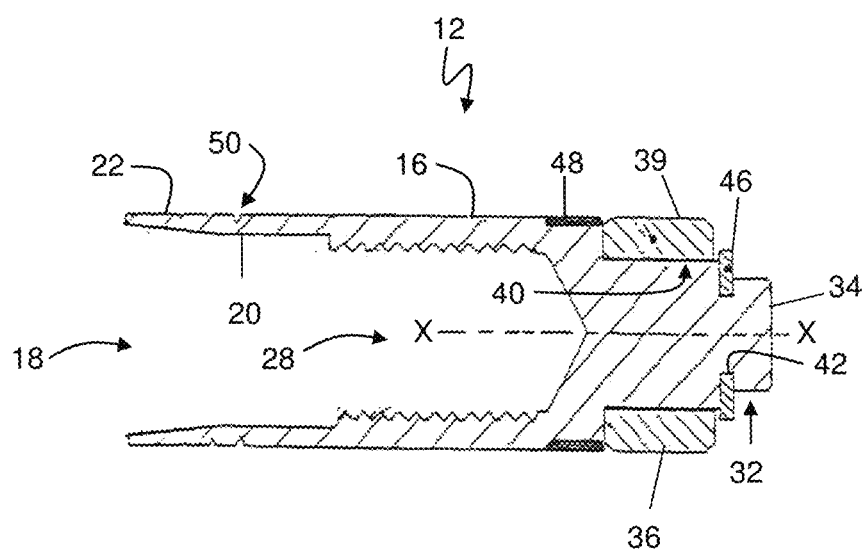
FIG. 2 is a cross-sectional view of the housing member of a heat exchanger tube plug made in accordance with the present invention.

At its front end 30, housing member 12 is provided with an eccentric assembly 32 which serves to lock the housing member tightly within the boiler tube 24, as is shown in FIG. 4, so that the insert member can be screwed into the housing member 12. Eccentric assembly 32 comprises a cylindrical post 34 which projects axially from front end 30 of the housing member 12, a ring member 36 which is mounted eccentrically on the post and is rotatable thereon, as shown in FIG. 2. As is shown in FIGS. 1 and 2, post 34 is disposed eccentrically relative to a longitudinal axis X-X of housing member 12.

The outer cylindrical surface 39 of ring member 36 may be serrated or knurled in order to provide enhanced frictional gripping between ring 36 and tube 24. Ring member 36 has a bore 40 which fits rotatably over post 34. Post 34 has a groove 42 near a distal end 44 thereof for receiving a locking snap ring 46. Snap ring 46 retains ring 36 on post 34.

Figure 6:
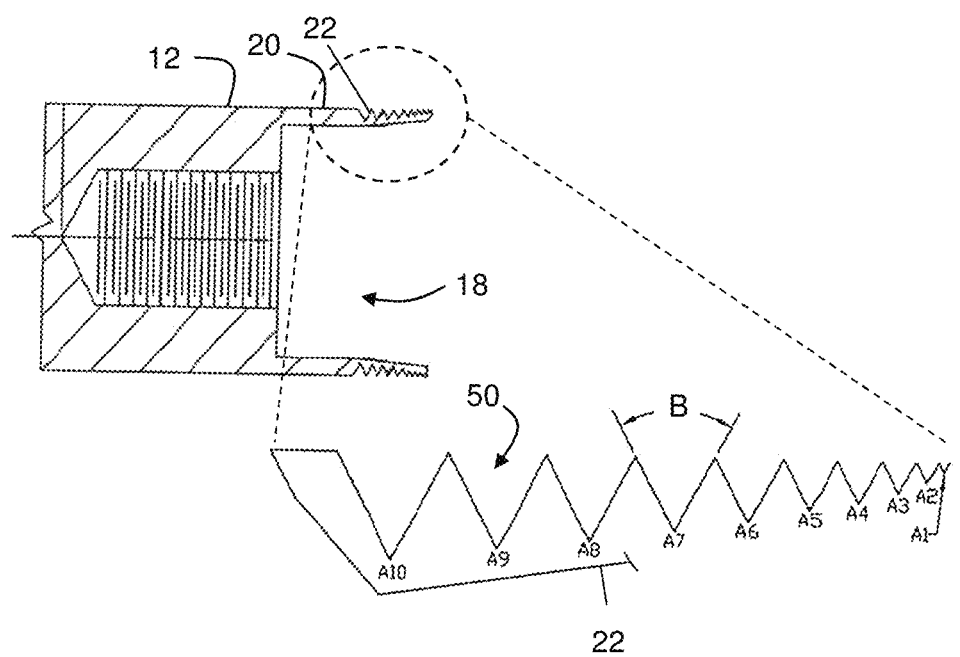
FIG. 6 is a cross-sectional view of a portion of a housing member according to the present invention.

Housing member 12 has a series of axial grooves 48 at the end adjacent to ring member 36 for enhancing frictional gripping of housing member 12 to tube 24 to prevent continued rotation of housing member 12 within tube 24. The outer surface of housing member 12 also includes a plurality of annular grooves 50 adjacent to the open bore 18 of the housing member to enhance the sealing characteristics of the plug as described below. As seen in FIG. 6, although each groove 50 is defined by a common angle B, preferably 60 degrees, the depth of each groove 50 and thus the width of the upper opening of groove decreases toward the open end of housing 12. In a preferred embodiment where plug 10 has an outer diameter of 0.60 inches, grooves 50 may be provided with the dimensions set forth in Table 1 below:

Driving recess 60 may then be engaged with an appropriate tool to cause ring member 36 to engage the sidewalls of the heat exchanger tube with its knurled surface and turn eccentrically on post 34. Ring member 36 thus presses tightly against inner surface 80 of heat exchanger tube 24 so that ring member 36 can no longer turn on post 34 and housing member 12 is tightly locked against turning within heat exchanger tube 24. When drive recess 60 is further turned by the tool, insert member 14 turns within housing member 12, with

TABLE 1

|   | A1 | A2 | A3 | A4 | A5 | A6 | A7 | A8 | A9 | A10 |
|---|---|---|---|---|---|---|---|---|---|---|
| X | −.0020 | −.0079 | −.0177 | −.0314 | −.0485 | −.0693 | −.0945 | −.1237 | −.1566 | −.1935 |
| Z | −.0034 | −.0068 | −.0102 | −.0136 | −.0160 | −.0200 | −.0236 | −.0270 | −.0300 | −.0339 |

Insert member 14 is comprised of a headed cap screw 52 and a tapered ferrule 54, which is preferably frustoconical. Preferably, cap screw 52 is a Hex socket head screw having a threaded shank 56 and an enlarged head 58 with a driving recess 60 formed in the head. While a Hex screw comprises a preferred embodiment, other types of recess drive apertures are known which permit high transmission of torque (e.g., above 450 inch pounds) while requiring minimal radial dimensioning for the recess.

Ferrule 54 has an internal passage 61 which is threaded to mate with the external thread of the shank 56 of screw 52. Ferrule 54 may either extend up to and flushly abut an shoulder surface 57 of head 58 of screw 52, particularly for smaller radius inserts 14, or ferrule 54 may have an outer diameter greater than the diameter of the head 58 such that the ferrule 54 surrounds head 58 of screw 52. Insert 14 could be made as an integral part, since socket head screws are readily available commercial items, with machining of the small cone 54 permits a substantial savings in machine time over integral formation of the insert 14. As seen in FIG. 5A, the outer surface of ferrule 54 decreases in radius from screw 52 toward first end 30, thereby defining a taper angle A. Angle is greater than four degrees and, preferably, between 4 and 10 degrees. The use of an angle A that is greater than four degrees is another significant departure from conventional products as the use of such an angle would invariably result in fracturing of thin wall 22 due to the ductility of the composition used to make housing member 12. As described above, the use of highly ductile material in combination with an increased angle allows for ten percent expansion of the outer diameter. For example, plug 10 having an outer diameter of 0.600 inches can expand up to 0.060 inches, whereas convention plugs are limited to a much lower expansion on the order of five percent, such as 0.030 inches for plug 10 having an outer diameter of 0.600 inches.

Figure 3:
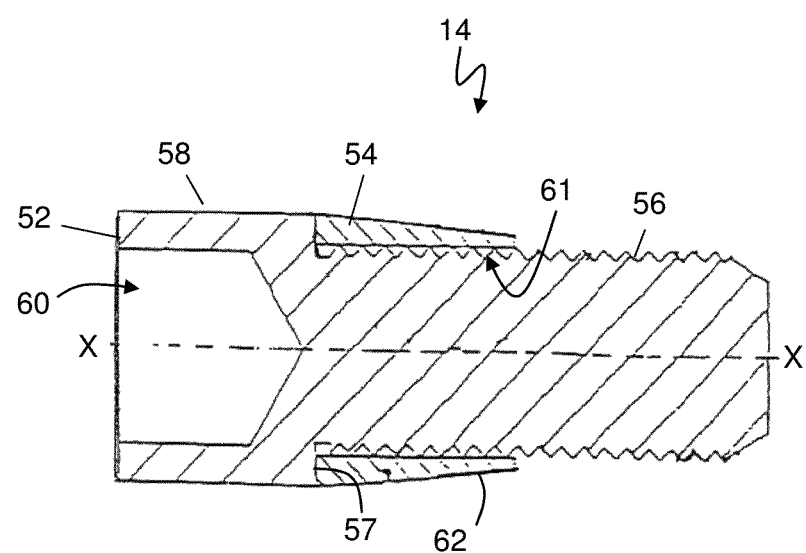
FIG. 3 is a cross-sectional view of an insert member of a heat exchanger tube plug made in accordance with the present invention.

As seen in FIG. 3, threaded shank 56 of insert member 14 is sized to be received in the threaded smaller bore 28 of the housing member 12. Thus, in use, insert member 14 is inserted into housing member 12 and threaded shank 56 is screwed into threaded bore 28 until outer surface 62, preferably having a spiral groove therein, engages the mouth of large bore 18 and insert member 14 can no longer be turned by hand. Eccentric ring member 36 is then rotated relative to post 34, by hand, until it is approximately concentric with body of housing member 12. In this condition, plug 10 is sized so that it may be inserted into the end of heat exchanger tube 24 to the position shown in FIG. 4, although the clearances between the plug and the tube wall may be less exaggerated than shown in FIG. 4.

threaded shank 56 screwing further into small bore 28. At the same time, surface 62 of ferrule 54 engages thin wall 20 of large bore 18 and, as the increasing diameter of ferrule 54 enters into large bore 18, ferrule 54 further deforms thin wall 20 of housing member 12 outwardly, increasing the diameter of bore 18. As thin wall 20 is expanded outwardly, expanded end portion 22 engages inner surface 80 of heat exchanger tube 24 and makes an effective seal therewith. Annular grooves 50 increase the sealing potential of plug 10. For example, if tube 24 has any corrosion on its inner surface 80, the raised portions between the annular grooves 50 would cut through any scale and the scale would be retained in the grooves 50, thereby enhancing the mechanical contact seal. By increasing the torque value permitted to be applied to insert member 14, insert member 14 is driven further into housing 12, thereby further increasing the deformation of tube 24 and further increasing the surface area of contact between thin wall 22 and tube 24.

What is claimed is:

1. A plug for sealing the end of a tube, comprising:
   a tubular housing having an outer diameter and a wall of annealed material having a modulus of elasticity of between 10,000 ksi to 30,000 ksi that extends from a first thickness that is between about three percent and about eight percent of said outer diameter to a second thickness that is between about five percent and about eleven percent of said outer diameter; and
   an insert extending along a longitudinal axis and including a ferrule having a taper of at least four degrees relative to said longitudinal axis; and
   wherein said wall is deformable by said ferrule to expand to a new outer diameter that is up to ten percent of said outer diameter.

2. The plug of claim 1, wherein said wall comprises an annealed alloy.

3. The plug of claim 2, wherein said alloy is selected from the group consisting of polymers, metal alloys, carbon steel, and stainless steel.

4. The plug of claim 1, further comprising an eccentric ring rotatably mounted to a post that projects axially from an end of said housing.

5. The plug of claim 1, wherein said tubular housing includes an inner threaded surface and said insert includes a post having a threaded outer surface for engaging said threaded inner surface of said housing.

6. A plug for sealing the end of a tube, comprising:
   a tubular housing having an outer diameter and a wall of annealed material having a modulus of elasticity of between 10,000 ksi to 30,000 ksi that extends from a first thickness that is between about three percent and about eight percent of said outer diameter to a second thickness that is between about five percent and about eleven percent of said outer diameter, wherein said wall is deformable by said ferrule to expand to a new outer diameter that is up to ten percent of said outer diameter;

an insert extending along a longitudinal axis and including a ferrule having a taper of at least four degrees relative to said longitudinal axis; and wherein said wall includes an outer surface having a series of grooves formed therein.

7. The plug of claim 4, wherein said each groove in said series of grooves comprises a V-shaped notch having an angle of about sixty degrees.

8. The plug of claim 5, wherein each groove in said series of grooves has a depth that is different than the depth of an adjacent said groove.

9. The plug of claim 6, wherein the depth of each groove increases from said first thickness to said second thickness.

10. The plug of claim 7, wherein the depth of each groove increases from about one-half percent of said outer diameter to six percent of said out diameter from said first thickness to said second thickness.

11. A method of plugging a tube having an inner bore, comprising the steps of:

providing a plug having a tubular housing with an outer diameter and a wall of annealed material having a modulus of elasticity of between 10,000 ksi to 30,000 ksi that extends from a first thickness that is between about three percent and about eight percent of said outer diameter to a second thickness that is between about five percent and about eleven percent of said outer diameter, and an insert extending along a longitudinal axis and including a ferrule having a taper of at least four degrees relative to said longitudinal axis; and inserting said insert into said housing so that said ferrule deforms said wall to expands up to ten percent of said outer diameter into engagement with the inner bore of said tube.

12. The method of claim 11, wherein said wall has an outer surface having a series of grooves formed therein.

13. The method of claim 12, wherein said each groove in said series of grooves comprises a V-shaped notch having an angle of about sixty degrees.

14. The method of claim 13, wherein the step of inserting said insert into said housing comprises the steps of engaging a threaded surface on the outside of said insert with a correspondingly threaded surface on the inside of said tubular housing and rotating said insert so that said insert is advanced into said housing.

* * * * *